Sept. 17, 1929.    F. TREUNER    1,728,313
HORIZONTAL BAR
Filed April 2, 1928
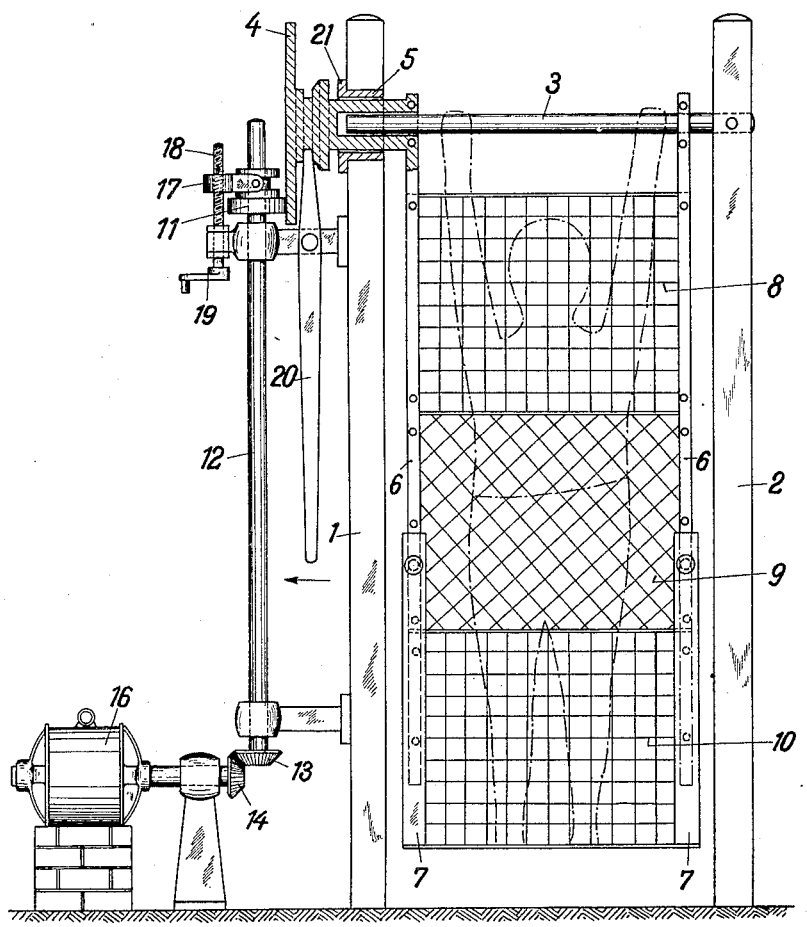
Inventor.
Festor Treuner Patented Sept. 17, 1929

1,728,313

UNITED STATES PATENT OFFICE

FEODOR TREUNER, OF DUISBURG, GERMANY

HORIZONTAL BAR

Application filed April 2, 1928, Serial No. 266,746, and in Germany November 15, 1926.

This invention relates to an improved horizontal bar specially designed to prevent accidents which easily happen at the giant-swing as some gymnasts are liable to dizziness when practicing the giant-swing so that they drop from the horizontal bar. Certain gymnasts even desist from practicing or carrying out the giant-swing as they are afraid of these accidents. The giant-swing is however very important from the hygienic point of view, as it improves the circulation of the blood.

This invention has for its object to make practicing on the horizontal bar quite safe, specially at the practicing or carrying out of the giant-swing, by attaching to the horizontal bar a net designed to catch the practicing gymnast, said net being rotated around the bar through the intermediary of a driving gear operated either by hand or by mechanical power.

An embodiment of the invention is illustrated, by way of example, in the accompanying drawing the only figure of which shows a horizontal bar with safety net in elevation partly in section.

The horizontal bar 3 is mounted as usual in the two uprights 1 and 2. On one of the ends of the bar 3 a sleeve is mounted which carries at the outer end a friction disc 4. This sleeve is journalled in a bearing 5 which has a brake disc 21.

The bar 6 of a frame is made in one piece with the inner end of the sleeve 7, and a bar 7 is adjustably attached to the lower end of the flat band 6. The second frame-element 6—7 is placed over the horizontal bar 3 so that it can freely rotate around the same. Between these two bars 6, 7 a net composed of three portions 8, 9 and 10 and of suitable material is fixed.

On the friction disc 4 acts a horizontal disc 11 mounted on a vertical shaft 12 journalled in stationary bearings which are fixed on the outer side of the upright 1. This vertical shaft 12 is rotated, either from a motor 16 as shown or by any other means, through the intermediary of a bevel wheel gear 14, 13. When driven mechanically, the speed at which the disc 4 rotates can be regulated by means of a fork 17 engaging with an annular groove in the disc or roller 11 and mounted on a screw spindle 18 adapted to be rotated by means of a crank handle 19.

In the hub of the friction disc 4 an annular groove is arranged with which engages a lever 20.

As either only the motor or only the crank handle is provided the crank handle 15 has been indicated in mixed lines.

When a pull is exerted upon the lower end of the lever 20 in the direction of the arrow line, the hub of the friction disc 4 is strongly pressed against the brake disc 21 the friction disc being moved away from the disc 4 so that it does not rotate and the safety net remains at rest.

I claim:—

1. A safety device for horizontal bars, comprising in combination with the horizontal bar proper, a frame with a net mounted on said horizontal bar so that it can rotate around the same, a friction wheel-gear connecting said frame to said horizontal bar, and a driving gear for rotating said safety net around said horizontal bar.

2. A safety device for horizontal bars, comprising in combination with the horizontal bar proper, a frame with a net mounted on said horizontal bar so that it can rotate around the same, a friction wheel-gear connecting said frame to said horizontal bar, a driving gear for rotating said safety net around said horizontal bar, and means for regulating the position of said driving gear with regard to said friction wheel gear to regulate the rotating speed of said safety net.

3. A safety device for horizontal bars, comprising in combination two uprights, a horizontal bar in said two uprights, a sleeve on one end of said horizontal bar journalled in said upright, a frame rigid with the inner end of said sleeve, a safety net in said frame, a brake disc in the hub of which said sleeve is rotatably mounted, a friction disc on the outer end of said sleeve, stationary bearings laterally extending from the outer side of one of said uprights, a vertical shaft mounted in said stationary bearings, a horizontal disc on the upper end of said vertical shaft bearing against said friction disc, an oscillatable lever engaging with the hub of said friction disc for pushing said friction disc away from the disc on the vertical shaft, a screw spindle for regulating the position of said horizontal disc to said friction disc, a bevel wheel transmission for rotating said vertical shaft, and a motor for driving said bevel wheel transmission.

In testimony whereof I affix my signature.
FEODOR TREUNER.